United States Patent
Sano

(10) Patent No.: US 8,102,743 B2
(45) Date of Patent: Jan. 24, 2012

(54) PLL CIRCUIT, RECORDING APPARATUS, AND CLOCK-SIGNAL GENERATING METHOD

(75) Inventor: Tatsushi Sano, Kanagawa (JP)

(73) Assignee: Sony Corporation, Tokyo (JP)

( * ) Notice: Subject to any disclaimer, the term of this patent is extended or adjusted under 35 U.S.C. 154(b) by 769 days.

(21) Appl. No.: 12/143,207

(22) Filed: Jun. 20, 2008

(65) Prior Publication Data

US 2009/0028017 A1 Jan. 29, 2009

(30) Foreign Application Priority Data

Jul. 23, 2007 (JP) .................................. 2007-191289

(51) Int. Cl.
 *G11B 20/14* (2006.01)
(52) U.S. Cl. ...................................... 369/59.2
(58) Field of Classification Search ................ None
 See application file for complete search history.

(56) References Cited

U.S. PATENT DOCUMENTS 5,978,333 A 11/1999 Kobayashi et al.

FOREIGN PATENT DOCUMENTS

| JP | 9-237421 | 9/1997 |
|----|----------|--------|
| JP | 2004-228902 | 8/2004 |
| JP | 2006-31890 | 2/2006 |

OTHER PUBLICATIONS

Office Action issued Aug. 30, 2011, in Japanese Patent Application No. 2007-191289.

*Primary Examiner* — Wayne Young
*Assistant Examiner* — Brian Butcher
(74) *Attorney, Agent, or Firm* — Oblon, Spivak, McClelland, Maier & Neustadt, L.L.P.

(57) ABSTRACT

A phase-locked loop circuit that generates a clock signal synchronized with an input signal with a predetermined frequency, including an oscillator configured to oscillate and generate the clock signal; a converter configured to convert the input signal into a digital signal using the clock signal generated by the oscillator as a sampling clock; a frequency divider configured to divide a frequency of the clock signal generated by the oscillator to generate a comparison clock signal and send the comparison clock signal as a feedback; a normalizer configured to normalize an amplitude value of the digital signal generated by the converter; and an oscillation controller configured to control a phase of the clock signal generated by the oscillator so as to reduce a phase difference between the normalized digital signal generated by the normalizer and the comparison clock signal sent as a feedback by the frequency divider.

3 Claims, 9 Drawing Sheets

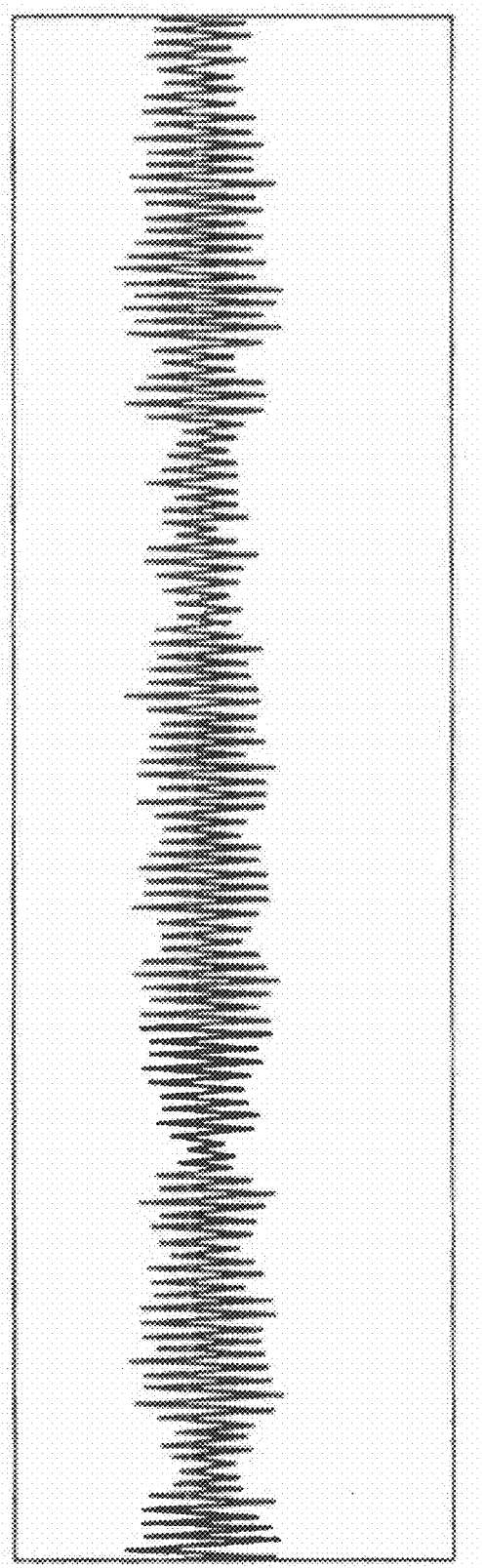

PLL CIRCUIT, RECORDING APPARATUS, AND CLOCK-SIGNAL GENERATING METHOD

CROSS REFERENCES TO RELATED APPLICATIONS

The present invention contains subject matter related to Japanese Patent Application JP 2007-191289 filed in the Japanese Patent Office on Jul. 23, 2007, the entire contents of which are incorporated herein by reference.

BACKGROUND OF THE INVENTION

1. Field of the Invention

The present invention relates to a PLL circuit, a recording apparatus, and a clock-signal generating method.

2. Description of the Related Art

Recent recording media such as optical discs from/to which data can be read and written have guide grooves which are preliminarily formed on a recording face. Modulation called "wobble" is applied to these grooves to record "address information (position information)". To store predetermined data on a recording medium, a recording apparatus extracts the address information as an electric signal with a predetermined frequency (which is called a "wobble signal" or an "input signal") and, using a phase-locked loop (PLL) circuit, generates a "write clock signal" synchronized with the wobble signal. Using the write clock signal, the recording apparatus writes the recording data. An example of this technique is described in Japanese Unexamined Patent Application Publication No. 9-237421.

SUMMARY OF THE INVENTION

The waveform of a wobble signal read by a recording apparatus contains many noise components due to crosstalk from adjacent tracks, beat noise, differences in output amplitude before and after recording, and variations in quality of recording media, and hence, the waveform changes. FIG. 10 illustrates an example of a wobble signal containing noise components. As shown in FIG. 10, the amplitude and frequency of the wobble signal greatly change due to the noise components on a wobble-by-wobble basis. Accordingly, a recording apparatus of the related art generates, using a multiplier PLL circuit, a write clock signal from a signal which contains many noise components and has a poor signal-to-noise (S/N) ratio.

Depending on parameters such as the frequency of a wobble signal and a track pitch, crosstalk from adjacent tracks or the like may affect the phase and amplitude of the wobble signal. In particular, the amplitude of a wobble signal read from a recording medium such as a digital versatile disc (DVD)+ is apt to be affected by crosstalk from adjacent tracks or the like. For the recording apparatus of the related art, changes in the amplitude of the wobble signal due to crosstalk or the like become "jitter" of the PLL circuit, that is, phase errors or the like. The phase errors affect not only the recording performance of the recording apparatus, but also the reproducing performance of the recorded data.

There is a method using tan δ, which is a circuit method for a PLL circuit in which such changes in the amplitude of a wobble signal do not affect phase errors of a write clock signal to be output from the PLL circuit. However, a circuit using this tan δ method involves large circuit dimensions and has difficulty in operating at a high speed.

A circuit disclosed in Japanese Unexamined Patent Application Publication No. 9-237421 is effective for amplitude changes when two items of information, namely, addition information and subtraction information, can be obtained. However, even with this circuit disclosed in Japanese Unexamined Patent Application Publication No. 9-237421, an analog circuit for sufficiently reducing noise of an input signal which is input to an analog-to-digital (A/D) converter is necessary. In constant angular velocity (CAV) recording in which the frequency of a wobble signal is not constant, if the frequency of an input wobble signal changes, the disclosed circuit is difficult to be realized.

It is desirable to easily reduce phase errors of a PLL circuit due to changes in the amplitude of an input signal.

According to an embodiment of the present invention, there is provided a phase-locked loop circuit that generates a clock signal synchronized with an input signal with a predetermined frequency, including the following elements: an oscillator configured to oscillate and generate the clock signal; a converter configured to convert the input signal into a digital signal using the clock signal generated by the oscillator as a sampling clock; a frequency divider configured to divide a frequency of the clock signal generated by the oscillator to generate a comparison clock signal and send the comparison clock signal as a feedback; a normalizer configured to normalize an amplitude value of the digital signal generated by the converter; and an oscillation controller configured to control a phase of the clock signal generated by the oscillator so as to reduce a phase difference between the normalized digital signal generated by the normalizer and the comparison clock signal sent as a feedback by the frequency divider.

With this structure, an input signal to the phase-locked loop circuit is converted by the converter into a digital signal, and the digital signal is normalized by the normalizer. The oscillation controller controls the phase of a clock signal generated by the oscillator so as to reduce the phase difference between the normalized digital signal and a comparison clock signal generated by dividing the frequency of the clock signal and sent as a feedback by the frequency divider. Since the oscillation controller controls the phase of the clock signal using the normalized digital signal, the oscillator can generate a clock signal whose phase is stable regardless of the amplitude value of the input signal. Since the normalizer normalizes the digital signal, even when the input signal has a high frequency, the digital signal can be normalized in a proper manner.

The normalizer may include the following elements: an amplitude measurement circuit configured to measure the amplitude value of the digital signal generated by the converter; a delay circuit configured to delay the digital signal generated by the converter by a time involved in measurement performed by the amplitude measurement circuit; and a divider circuit configured to divide the delayed digital signal generated by the delay circuit by the amplitude value measured by the amplitude measurement circuit. With this structure, the digital signal generated by the converter is branched to the amplitude measurement circuit and the delay circuit. In one branch, the amplitude measurement circuit measures the amplitude value of the digital signal. In the other branch, the delay circuit delays the digital signal by a time (delay) involved in measuring the amplitude. Accordingly, since the divider circuit can divide the digital signal by its measured amplitude value serving as a reference for normalization, the normalizer can normalize the digital signal and output the normalized digital signal.

The divider circuit may extract, from among multiple normalized digital signals stored in advance, a normalized digital signal corresponding to the delayed digital signal generated by the delay circuit and the amplitude value measured by the amplitude measurement circuit. With this structure, normalized digital signals, each of which is obtained by dividing a digital signal by an amplitude value using the divider circuit, are recorded in advance. When a digital signal and an amplitude value are input to the divider circuit, the divider circuit extracts a normalized digital signal corresponding to the input digital signal and amplitude value and outputs the extracted normalized digital signal. Accordingly, the divider circuit can output the normalized digital signal without actually performing division processing.

The divider may include the following elements: a plurality of multiplier circuits each configured to receive the delayed digital signal generated by the delay circuit and multiply the digital signal by one of different positive values; and an adder circuit configured to add a combination of one or more multiplied digital signals obtained by the plurality of multiplier circuits to generate a quotient obtained by dividing the delayed digital signal generated by the delay circuit by the amplitude value measured by the amplitude measurement circuit. With this structure, the plurality of multiplier circuits each output a value obtained by multiplying the digital signal by a positive value are provided. The positive value is different for each multiplier circuit. Accordingly, the plurality of multiplier circuits output digital signals having different values obtained by multiplication. The adder circuit adds a combination of one or more digital signals among these digital signals having different values, thereby outputting a quotient obtained by dividing the digital signal by the amplitude value, that is, the normalized digital signal.

According to another embodiment of the present invention, there is provided a recording apparatus that includes a phase-locked loop circuit configured to generate a write clock signal synchronized with an input signal which has a predetermined frequency and which is read from a recording medium and that records recording data on the recording medium on the basis of the write clock signal, including the following elements: an oscillator configured to oscillate and generate the write clock signal; a converter configured to convert the input signal into a digital signal using the write clock signal generated by the oscillator as a sampling clock; a frequency divider configured to divide a frequency of the write clock signal generated by the oscillator to generate a comparison clock signal and send the comparison clock signal as a feedback; a normalizer configured to normalize an amplitude value of the digital signal generated by the converter; and an oscillation controller configured to control a phase of the write clock signal generated by the oscillator so as to reduce a phase difference between the normalized digital signal generated by the normalizer and the comparison clock signal sent as a feedback by the frequency divider. With this structure, the write clock signal whose phase is stable regardless of the amplitude of the input signal can be generated.

According to another embodiment of the present invention, there is provided a clock-signal generating method of generating a clock signal synchronized with an input signal with a predetermined frequency, including the steps of converting the input signal into a digital signal using the clock signal as a sampling clock and normalizing the digital signal; and generating the clock signal so as to reduce a phase difference between the normalized digital signal and a comparison clock signal generated by dividing a frequency of the clock signal. With this method, the clock signal whose phase is stable regardless of the amplitude of the input signal can be generated.

The digital signal may be normalized by dividing the digital signal by an amplitude value of the digital signal.

According to the embodiments of the present invention, phase errors of a PLL circuit due to changes in the amplitude of an input signal can be easily reduced.

BRIEF DESCRIPTION OF THE DRAWINGS

FIG. 10 is a graph showing a wobble signal input to the PLL circuit according to the related art.

DESCRIPTION OF THE PREFERRED EMBODIMENTS

Figure 1:
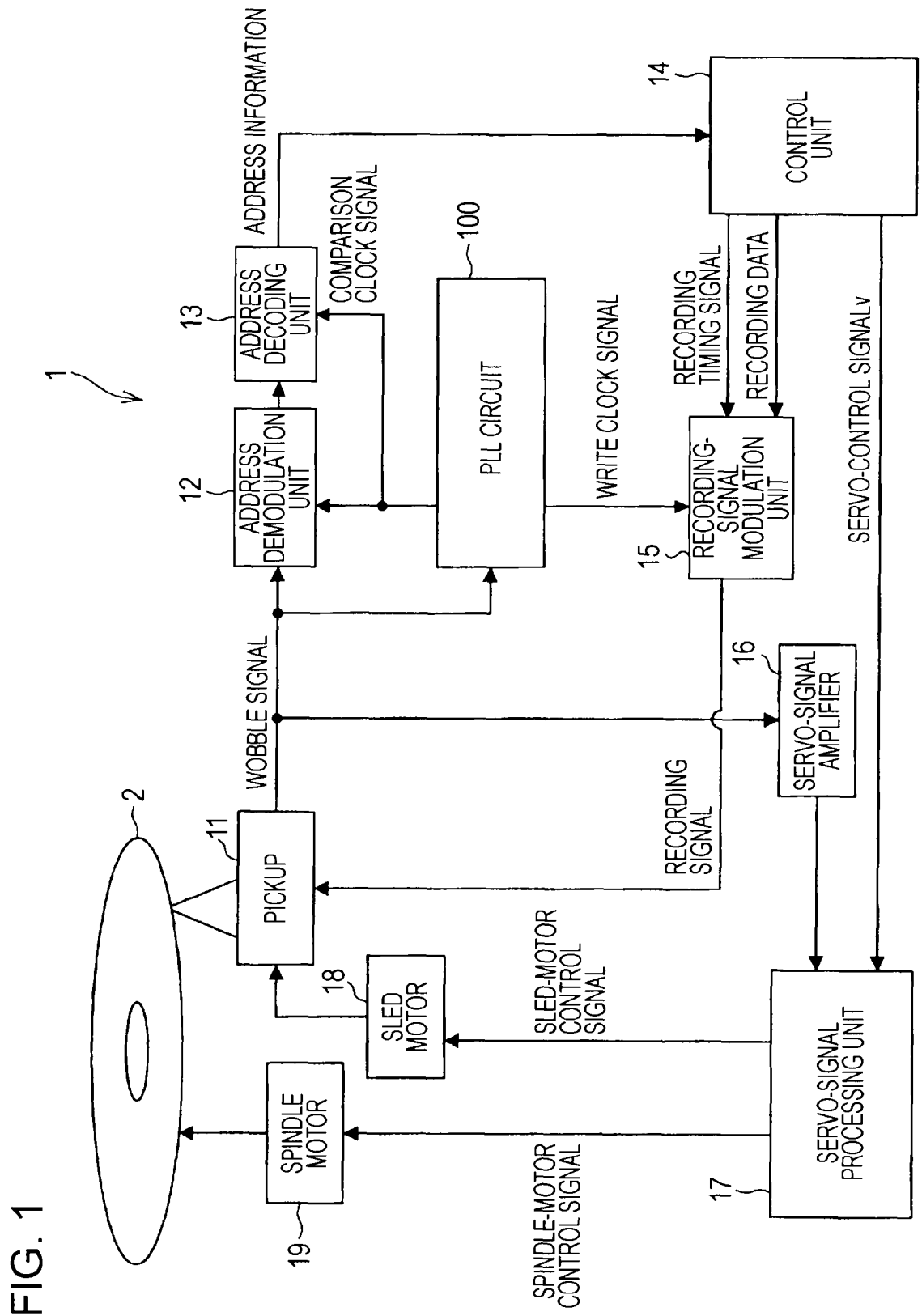
FIG. 1 is a block diagram for illustrating the structure of a recording apparatus according to an embodiment of the present invention.

Preferred embodiments of the present invention will now herein be described in detail with reference to the accompanying drawings. In the specification and drawings, structural elements having substantially the same functions are given the same reference numerals, and descriptions thereof are omitted to avoid redundancy.

PLL Circuit According to Related Art

Figure 9:
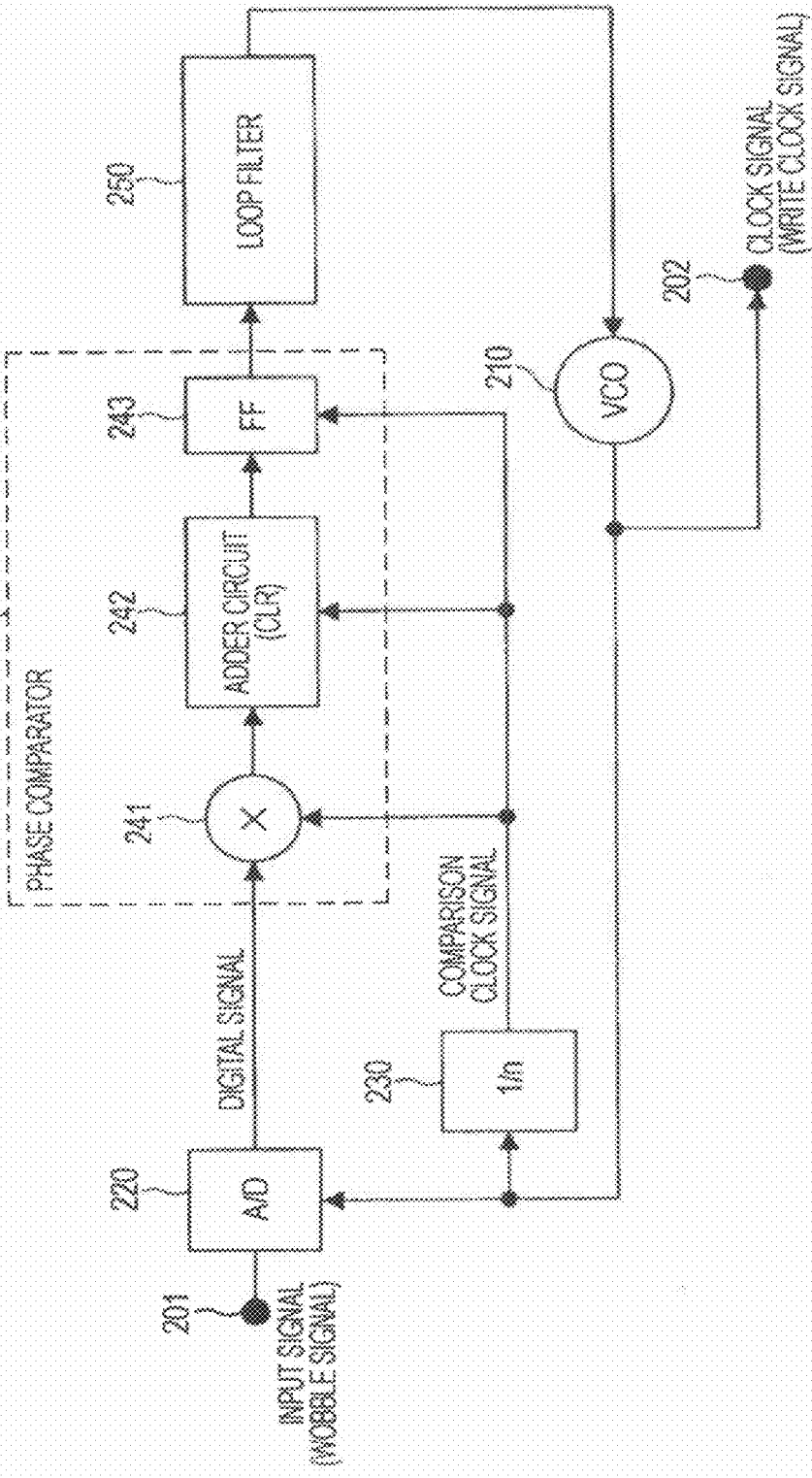
FIG. 9 is a block diagram showing the structure of a PLL circuit according to the related art.

Before describing an embodiment of the present invention, referring to FIG. 9, a digital PLL circuit according to the related art is described. FIG. 9 is a block diagram showing the structure of a PLL circuit according to the related art.

As shown in FIG. 9, a PLL circuit 200 according to the related art receives an analog input signal at an input terminal 201 and outputs, from an output terminal 202, a clock signal synchronized with the frequency of the input signal. When the PLL circuit 200 is used in a recording apparatus, a wobble signal is input as the input signal, and a write clock signal is output.

The PLL circuit 200 according to the related art includes a voltage-controlled oscillator (hereinafter referred to as a "VCO") 210, an A/D converter 220, a frequency divider 230, a phase comparator 240, and a loop filter (hereinafter referred to as an "LF") 250. The PLL circuit 200 according to the related art forms a feedback circuit that feeds back an output signal.

The VCO 210 is a circuit that oscillates and generates a clock signal serving as an output signal. The oscillation frequency of the VCO 210 changes according to a signal (voltage value) input from the phase comparator 240 via the LF 250. The VCO 210 can be configured in various manners as long as the oscillation frequency thereof changes according to an input signal (voltage value). For example, the VCO 210 may be an analog circuit that converts an input signal using a digital-to-analog (D/A) converter and outputs an analog value. A clock signal generated by the VCO 210 is output as an output signal of the PLL circuit 200 and is additionally output to the A/D converter 220 and the frequency divider 230.

Using the clock signal generated by the VCO 210 as a sampling clock, the A/D converter 220 converts an analog input signal input to the PLL circuit 200 into a digital signal and outputs the digital signal to the phase comparator 240.

The frequency divider 230 receives the clock signal generated by the VCO 210, divides the frequency of the clock signal by n to generate a comparison clock signal, and sends the comparison clock signal as a feedback to a multiplier circuit 241, an adder circuit 242, and a flip flop (hereinafter referred to as an "FF") 243 included in the phase comparator 240.

The phase comparator 240 is a circuit that controls the oscillation frequency of the VCO 210 by outputting, as a voltage value, the phase difference between the digital signal generated by the A/D converter 220 and the comparison clock signal generated by dividing the frequency of the input signal by n and sent as a feedback by the frequency divider 230. The phase comparator 240 includes the multiplier circuit 241, the adder circuit 242, and the FF 243.

The multiplier circuit 241 multiplies the digital signal from the A/D converter 220 by the comparison clock signal generated by dividing the frequency of the clock signal by n and sent as a feedback by the frequency divider 230. Alternatively, when the comparison clock signal from the frequency divider 230 is a binary value indicating 1 or −1, the multiplier circuit 241 may be a circuit that inverts the digital signal from the A/D converter 220 and outputs the inverted signal in the case where the comparison clock signal is −1.

The adder circuit 242 is a circuit that adds, on the basis of the comparison clock signal generated by dividing the frequency of the clock signal by n and sent as a feedback by the frequency divider 230, output signals from the multiplier circuit 241 within a comparison interval and outputs the added result. The "comparison interval" is a time interval in which phase comparison is performed by the phase comparator 240. That is, when the phase comparator 240 compares the phase of one cycle of a wobble signal which is an input signal, the comparison interval may be set to one cycle.

The adder circuit 242 adds n items of data in the case where, for example, the PLL circuit 200 generates a clock signal by multiplying the input signal by n (that is, multiplying the frequency by n).

The FF 243, which is a flip flop, temporarily stores a signal obtained by addition and output from the adder circuit 242 and outputs the signal to the LF 250 on the basis of the comparison clock signal generated by dividing the frequency of the clock signal by n and sent as a feedback by the frequency divider 230.

The LF 250 is a circuit that smoothes an output signal from the phase comparator 240, that is, a signal for controlling the oscillation frequency of the VCO 210, and outputs the smoothed signal to the VCO 210. The LF 250 is implemented by, for example, an infinite impulse response (IIR) filter.

The PLL circuit 200 according to the related art, which has the foregoing structure, outputs a clock signal synchronized with an input signal, that is, a clock signal obtained by multiplying an input signal by n, from the VCO 210. According to the PLL circuit 200 of the related art, when an input signal (wobble signal) changes, that is, more particularly, when the amplitude of an input signal changes, so-called "jitter" (phase errors, etc.) of a clock signal which is an output signal increases. Accordingly, the recording performance of a recording apparatus using the PLL circuit 200 deteriorates. Further, the reproducing performance of the recorded data deteriorates.

In order to overcome this problem, the amplitude of an input signal may be equalized using an automatic gain control (AGC) circuit or the like, which is provided upstream of the PLL circuit 200. A general AGC circuit has a slow response rate. In contrast, as shown in FIG. 10, the amplitude of a wobble signal obtained from a recording medium greatly changes on a wobble-by-wobble basis. In some cases, the amplitude changes at a rate faster than the response rate of the AGC circuit. Therefore, even when the AGC circuit is provided, it is difficult to equalize the amplitude of an input signal of the PLL circuit 200 so as to make an output value of the PLL circuit 200 stable.

The inventor of the present application has extracted and analyzed problems of the PLL circuit 200 according to the related art and conducted intensive research on a PLL circuit and the like in order to solve these problems. Accordingly, the inventor has conceived embodiments of the present invention. Hereinafter, a PLL circuit according to an embodiment of the present invention and a recording apparatus using the same will be described in detail with reference to FIGS. 1 to 8.

Structure of Recording Apparatus 1

Referring to FIG. 1, the structure of a recording apparatus 1 according to an embodiment of the present invention is described. FIG. 1 is a block diagram for illustrating the structure of the recording apparatus 1 according to the embodiment of the present invention.

The following description assumes that the recording apparatus 1 according to the present embodiment is an apparatus that records recording data on a recording medium, such as an optical disk 2 having a predetermined format. However, the present invention is not limited to this example and is applicable to a recording apparatus having any structure as long as it records recording data on a recording medium using a write clock signal output from a PLL circuit 100, which will be described later.

Grooves are preliminarily formed on a recording face of the optical disk 2, which is an example of a recording medium to which an embodiment of the present invention can be applied. Modulation called "wobble" is applied to these grooves. These wobbles each indicate address information on the plate face of the optical disk 2. The recording apparatus 1 according to the present embodiment reads the wobbles as a wobble signal and, from the wobble signal, generates a write clock signal synchronized with the wobble signal. Using the write clock signal, the recording apparatus 1 records recording data on the optical disk 2.

An example of the structure of the recording apparatus 1 according to the present embodiment is schematically described below. However, the present invention is not limited to the structure described below.

Referring to FIG. 1, the recording apparatus 1 includes a pickup 11, the PLL circuit 100, an address demodulation unit 12, an address decoding unit 13, a control unit 14, a recording-signal modulation unit 15, a servo-signal amplifier 16, a servo-signal processing unit 17, a sled motor 18, and a spindle motor 19.

The pickup 11 radiates a laser beam to the optical disk 2 on the basis of a recording signal output from the recording-signal modulation unit 15. The wavelength and spot diameter of the laser differs according to the format of the optical disk 2. The pickup 11 receives light reflected from the optical disk 2, converts the light into a wobble signal which is an electric signal, and outputs the wobble signal to the PLL circuit 100, the address demodulation unit 12, and the servo-signal amplifier 16.

The PLL circuit 100 receives the wobble signal from the pickup 11, generates a write clock signal synchronized with the wobble signal, and outputs the write clock signal to the recording-signal modulation unit 15. The write clock signal generated by the PLL circuit 100 is an important signal used as a clock when the recording apparatus 1 records recording data on the optical disk 2. The PLL circuit 100 included in the recording apparatus 1 according to the present embodiment can reduce phase errors and the like of the write clock signal. The PLL circuit 100 is described in more detail later.

The PLL circuit 100 outputs a comparison clock signal, e.g., a binary comparison clock signal, synchronized with the frequency of the wobble signal to the address demodulation unit 12 and the address decoding unit 13. The comparison clock signal is a signal generated by the frequency divider 140 in order to perform phase comparison in the PLL circuit 100.

On the basis of the comparison clock signal input from the PLL circuit 100, the address demodulation unit 12 demodulates the wobble signal to obtain a signal that has been modulated into wobbles and outputs this signal as a data string to the address decoding unit 13.

On the basis of the comparison clock signal input from the PLL circuit 100, the address decoding unit 13 decodes the data string input from the address demodulation unit 12 and converts it into address information. The address decoding unit 13 outputs the address information to the control unit 14.

On the basis of the address information input from the address decoding unit 13, the control unit 14 recognizes the position on the optical disk 2 at which light is radiated from the pickup 11 and controls the recording-signal modulation unit 15 and the servo-signal processing unit 17 in order that recording data to be recorded can be recorded at that position on the optical disk 2. In order to do so, the control unit 14 outputs a recording timing signal based on the address information and recording data to be recorded on the optical disk 2 to the recording-signal modulation unit 15. The control unit 14 outputs a servo control signal for controlling the servo-signal processing unit 17 on the basis of the address information or the like to the servo-signal processing unit 17.

In this case, the control unit 14 may be connected to an external recording apparatus (not shown) or an upper control unit (not shown). In this case, recording data may be read from the external recording apparatus and may be output, or the control unit 14 may be controlled by the upper control unit or the like to output a recording timing signal, recording data, a servo control signal, and the like.

The recording-signal modulation unit 15 outputs a signal for driving the pickup 11 to record the recording data on the optical disk 2. In order to do so, the recording-signal modulation unit 15 modulates the recording data into a recording signal and outputs the recording signal to the pickup 11. The pickup 11 receives the recording signal and, on the basis of the recording signal, radiates a laser beam to the optical disk 2.

In this case, on the basis of the recording timing signal output from the control unit 14, the recording-signal modulation unit 15 starts outputting the recording signal. That is, the recording timing signal is a signal indicating a timing at which recording should begin. In other words, the recording timing signal is a signal indicating that the pickup 11 is ready to radiate a laser beam to the address on the optical disk 2 at which the recording data should be recorded. The recording-signal modulation unit 15 outputs the recording signal in synchronization with the write clock signal output from the PLL circuit 100.

The servo-signal amplifier 16 amplifies a wobble signal output from the pickup 11 and outputs the amplified wobble signal to the servo-signal processing unit 17.

On the basis of the wobble signal output from the servo-signal amplifier 16 and the servo control signal output from the control unit 14, the servo-signal processing unit 17 controls the rotation of the optical disk 2 and the position of the pickup 11. In order to do so, on the basis of the wobble signal and the servo control signal, the servo-signal processing unit 17 outputs a sled-motor control signal to the sled motor 18 and a spindle-motor control signal to the spindle motor 19.

The sled motor 18 is driven by the sled-motor control signal output from the servo-signal processing unit 17 and moves the pickup 11 to a predetermined position.

The spindle motor 19 is driven by the spindle-motor control signal output from the servo-signal processing unit 17 and rotates the optical disk 2. In this case, for example, in CAV recording, the spindle motor 19 rotates the optical disk 2 at a constant rate of rotation. In constant linear velocity (CLV) recording, the spindle motor 19 may change the rate of rotation of the optical disk 2 according to the position of the pickup 11.

The structure of the recording apparatus 1 has been described above. Besides the foregoing structure, the recording apparatus 1 may have various circuits including a tracking adjustment circuit and a focusing adjustment circuit, although detailed descriptions thereof are omitted. Next, the recording operation of the recording apparatus 1 with the foregoing structure will be schematically described below.

Operation of Recording Apparatus 1

In order to record predetermined recording data, the control unit 14 moves the pickup 11 to a predetermined position while rotating the optical disk 2 via the servo-signal processing unit 17 and the like. The control unit 14 causes, using the recording-signal modulation unit 15 and the like, the pickup 11 to radiate a predetermined laser beam.

The laser beam is radiated to the optical disk 2 and is reflected from the optical disk 2. The reflected light has been modulated by wobbles formed in the grooves in the optical disk 2. That is, the reflected light has been modulated by the same frequency as the wobble modulation frequency. The pickup 11 converts the reflected light into a wobble signal which is an electric signal and outputs the wobble signal.

The address demodulation unit 12 having received the wobble signal and the address decoding unit 13 connected to the address demodulation unit 12 decode, using the comparison clock signal output from the PLL circuit 100, address information from modulation included in the wobble signal and outputs the address information to the control unit 14. The address information indicates the position on the recording face of the optical disk 2 to which a laser beam is ready to be radiated from the pickup 11.

The control unit 14 adjusts the rate of rotation of the optical disk 2 and the position of the pickup 11 so that the address information coincides with a target address at which predetermined recording data should be recorded. When the two addresses coincide with each other, that is, when the pickup 11 reaches the address at which recording should be performed, the control unit 14 outputs the recording timing signal and recording data.

Having received the recording timing signal, the recording-signal modulation unit 15 modulates the recording data into a recording signal and outputs the recording signal to the pickup 11 and causes the pickup 11 to radiate a laser beam so as to write the recording data. In this case, the PLL circuit 100 generates a write clock signal from a wobble signal. The recording-signal modulation unit 15 causes the pickup 11 to write recording data in synchronization with the write clock signal.

With the foregoing operation, the recording apparatus 1 can record desired recording data at a desired address on the optical disk 2. When a write clock signal output from the PLL circuit 100 includes errors, even when writing at a target address begins, the address may be shifted while recording data is being written. However, according to the PLL circuit 100 of the present embodiment, such errors can be reduced. The PLL circuit 100 according to the present embodiment is described in more detail below.

Structure of PLL Circuit 100

Figure 2:
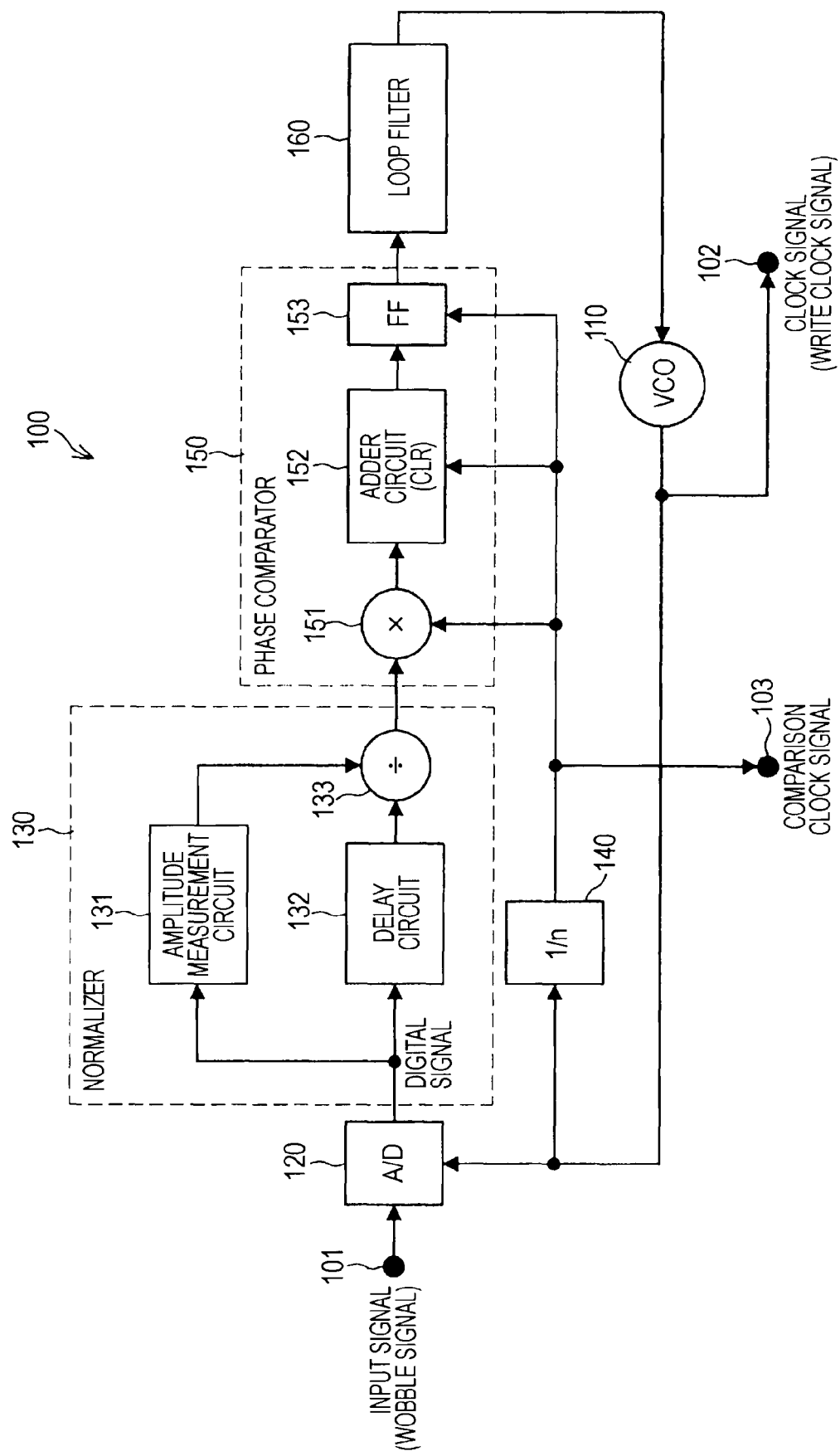
FIG. 2 is a block diagram for illustrating the structure of a PLL circuit according to the embodiment.

Referring now to FIG. 2, the structure of the PLL circuit 100 included in the recording apparatus 1 according to the present embodiment is described. FIG. 2 is a block diagram for illustrating the structure of the PLL circuit 100 according to the present embodiment. In FIG. 2, an input terminal 101 is a terminal to which a wobble signal is input from the pickup 11 shown in FIG. 1. An output terminal 102 is a terminal connected to the recording-signal modulation unit 15 shown in FIG. 1 and outputs a write clock signal. Further, an output terminal 103 is a terminal connected to the address demodulation unit 12 and the address decoding unit 13 shown in FIG. 1 and outputs a comparison clock signal.

As shown in FIG. 2, the PLL circuit 100 includes a VCO 110, an A/D converter 120, a normalizer 130, a frequency divider 140, a phase comparator 150, and an LF 160. The PLL circuit 100 forms a feedback circuit that feeds back an output signal.

The VCO 110 is an example of an oscillator that oscillates and generates a write clock signal (hereinafter referred to as a "clock signal") which is an output signal of the PLL circuit 100. The oscillation frequency of the clock signal changes according to a signal (voltage value) input from the phase comparator 150 via the LF 160. The VCO 110 can be configured in various manners as long as the oscillation frequency of the clock signal changes according to the input signal. For example, the VCO 110 may be an analog circuit that converts an input signal using a D/A converter and outputs an analog value. When the signal output from the phase comparator 150 is a current value, the oscillation frequency of the clock signal may change according to the current value.

A clock signal generated by the VCO 110 is output as an output signal of the PLL circuit 100 and is additionally output to the A/D converter 120 and the frequency divider 140.

The A/D converter 120 is an example of a converter that converts, using the clock signal generated by the VCO 110 as a sampling clock, a wobble signal which is an analog input signal (hereinafter may also be referred to as an "input signal") into a digital signal and outputs the digital signal to the normalizer 130.

The normalizer 130 receives the digital signal (that is, the digitized wobble signal) generated by the A/D converter 120 and normalizes the amplitude value of the digital signal. The normalizer 130 outputs the normalized digital signal to the phase comparator 150. The structure of the normalizer 130 is described later.

The frequency divider 140 receives the clock signal generated by the VCO 110 and divides the frequency of the clock signal by n (that is, the frequency is multiplied 1/n times) to generate a comparison clock signal, and sends the comparison clock signal as a feedback to the phase comparator 150.

In the case of the recording apparatus 1 according to the present embodiment, the comparison clock signal is additionally output to the address demodulation unit 12 and the address decoding unit 13.

The phase comparator 150 is an example of a phase comparator that controls the phase of a clock signal output from the VCO 110 so that the normalized digital signal generated by the normalizer 130 is in phase with the comparison clock signal generated by dividing the frequency of the clock signal by n and sent as a feedback by the frequency divider 140.

In other words, the phase comparator 150 receives the normalized digital signal from the normalizer 130 and the comparison clock signal generated by dividing the frequency of the clock signal by n by the frequency divider 140. The phase comparator 150 outputs a voltage signal to the VCO 110 via the LF 160 so that the phase difference between the digital signal and the comparison clock signal is reduced to be about zero.

In order to do so, the phase comparator 150 includes a multiplier circuit 151, an adder circuit 152, and an FF 153.

The multiplier circuit 151 multiplies the normalized digital signal generated by the normalizer 130 by the comparison clock signal generated by dividing the frequency of the clock signal by n and sent as a feedback by the frequency divider 140. Alternatively, when the comparison clock signal from the frequency divider 140 is a binary value indicating 1 or −1, the multiplier circuit 151 may be a circuit that inverts the digital signal from the A/D converter 120 and outputs the inverted signal in the case where the comparison clock signal is −1, and outputs the comparison clock signal without inverting it in the case where the comparison clock signal is 1.

The adder circuit 152 is a circuit that adds, on the basis of the comparison clock signal generated by dividing the frequency of the clock signal by n and sent as a feedback by the frequency divider 140, output signals from the multiplier circuit 151 within a comparison interval and outputs the added result. The "comparison interval" is a time interval in which phase comparison is performed by the phase comparator 150. That is, when the phase comparator 150 compares the phase of a wobble signal which is an input signal for one cycle, the comparison interval may be set to one cycle. In the following description, simply the term "interval" indicates a time interval corresponding to one cycle of a wobble signal.

The adder circuit 152 adds n items of data in the case where, for example, the PLL circuit 100 generates a clock signal by multiplying the input signal by n (that is, multiplying the frequency by n).

The FF 153 temporarily stores, on the basis of the comparison clock signal generated by dividing the frequency of the clock signal by n and sent as a feedback by the frequency divider 140, a signal obtained by addition and output from the adder circuit 152 in order to output the obtained signal to the LF 160.

The LF 160 is a circuit that smoothes an output signal from the phase comparator 150, that is, a signal for controlling the oscillation frequency of the VCO 110, and outputs the smoothed signal to the VCO 110. The LF 160 is implemented by, for example, an IIR filter.

The PLL circuit 100 with the foregoing structure outputs a clock signal synchronized with an input signal, that is, a clock signal obtained by multiplying an input signal by n, from the VCO 110. According to the PLL circuit 100, one feature resides in that the normalizer 130 for normalizing a digital signal generated by the A/D converter 120 is provided. The normalizer 130 is described below.

Structure of Normalizer 130

The normalizer 130 according to the present embodiment includes an amplitude measurement circuit 131, a delay circuit 132, and a divider circuit 133.

The amplitude measurement circuit 131 receives an input of the digital signal generated by the A/D converter 120 and measures the amplitude value serving as a reference for normalizing the digital signal (reference amplitude value, which may be simply referred to as the "amplitude value" hereinafter). That is, inside the PLL circuit 100, the amplitude measurement circuit 131 performs AGC and measures the amplitude value of the digital signal in order to make the digital signal input to the phase comparator 150 stable.

The amplitude measurement circuit 131 may be implemented by, for example, an average measurement circuit. In this case, the amplitude measurement circuit 131 may calculate, as the reference amplitude value, for example, an average amplitude of input signals of m cycles, that is, wobble signals for m wobbles (hereinafter may be referred to as an "interval m"). Alternatively, the amplitude measurement circuit 131 may be implemented by, for example, a maximum measurement circuit. In this case, the amplitude measurement circuit 131 may measure, as the reference amplitude value, for example, the maximum amplitude value of each cycle of the input signal, that is, the maximum amplitude value of a wobble signal for one wobble. However, the present invention is not limited to these examples. The amplitude measurement circuit 131 may be another circuit as long as it can measure the amplitude serving as a reference when normalization is performed.

The delay circuit 132 receives the digital signal generated by the A/D converter 120 and delays the digital signal by a time taken by the amplitude measurement circuit 131 to measure the digital signal. That is, for example, when the amplitude measurement circuit 131 is an average measurement circuit, in order to obtain the average of wobble signals within the interval m, the delay circuit 132 delays the amplitude output from the amplitude measurement circuit 131 by a time corresponding to the interval m. Therefore, when the delay circuit 132 delays the digital signal by a delay amount corresponding to the equivalent time, the digital signal can be synchronized with the amplitude value. Alternatively, for example, when the amplitude measurement circuit 131 is a maximum measurement circuit, the amplitude measurement circuit 131 may measure the amplitude in each interval. The delay amount in this case may correspond to a time taken by the maximum measurement circuit to measure the maximum value. The delay circuit 132 may be implemented by, for example, a shift register.

The divider circuit 133 divides the delayed digital signal generated by the delay circuit 132 by the amplitude value measured by the amplitude measurement circuit 131, thereby normalizing the digital signal. The divider circuit 133 outputs the normalized digital signal to the phase comparator 150. By dividing the digital signal by the reference amplitude value using the divider circuit 133, the amplitude of the digital signal input to the phase comparator 150, that is, the wobble signal, can be kept constant regardless of errors and the like.

In this case, the normalizer 130 including the foregoing divider circuit 133 normalizes the input signal (wobble signal), which has been converted into a digital signal by the A/D converter 120. Accordingly, normalization can be performed every time the wobble signal is input, and the processing rate can be increased, compared with an AGC circuit of the related art.

In order to further enhance this advantage, according to the PLL circuit 100 of the present embodiment, the time involved in performing the division processing can also be reduced. An example of the divider circuit 133 which achieves this advantage is described with reference to FIG. 3.

Example of Structure of Divider Circuit 133

Figure 3:
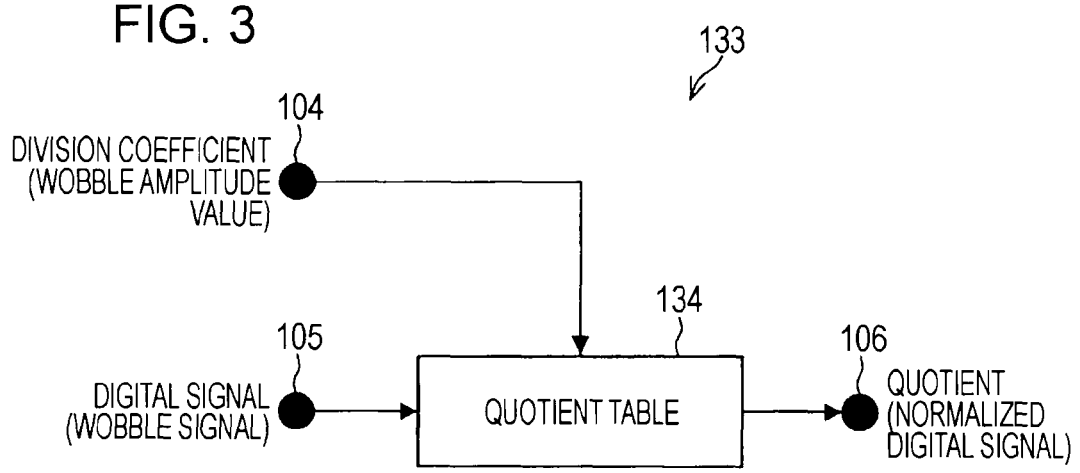
FIG. 3 is a block diagram for illustrating an example of a divider circuit included in the PLL circuit according to the embodiment.

FIG. 3 is a block diagram for illustrating an example of the divider circuit 133 included in the PLL circuit 100 according to the present embodiment. In FIG. 3, an input terminal 104 is a terminal to which the amplitude value (division coefficient) is input from the amplitude measurement circuit 131 shown in FIG. 2. An input terminal 105 is a terminal to which the delayed digital signal is input from the delay circuit 132. Further, an output terminal 106 is a terminal connected to the phase comparator 150 and outputs the quotient which is the divided result, that is, the normalized digital signal (wobble signal).

The example of the divider circuit 133 included in the PLL circuit 100 according to the present embodiment has a quotient table 134, as shown in FIG. 3.

The quotient table 134 is implemented by, for example, a look-up table recorded in a read-only memory (ROM) or the like (e.g., a ROM TABLE). With the quotient table 134, an input digital signal and an amplitude value are table-converted. That is, the quotient table 134 stores a quotient obtained by dividing a digital signal by an amplitude value in association with combinations of multiple digital signals and multiple amplitude values. In this case, the quotient table 134 stores a quotient in association with a digital signal and an amplitude value used to obtain the quotient.

In other words, the quotient table 134 has, for example, digital signals on ordinate and amplitudes on abscissa, and quotients each obtained from a corresponding one of the digital signals and a corresponding one of the amplitude values are arranged at the intersections of the digital signals and the amplitude values. That is, the quotient table 134 is a table having items of information arranged in matrix.

When the quotient table 134 receives an amplitude value and a digital signal from the amplitude measurement circuit 131 and the delay circuit 132, respectively, the quotient table 134 extracts, from among the stored quotients, a quotient corresponding to the amplitude value and the digital signal and outputs the extracted quotient.

In this manner, since the divider circuit 133 has the quotient table 134, the divider circuit 133 can output a quotient, which is a value obtained by dividing a digital signal by an amplitude value, without performing division processing which involves a longer processing time than multiplication processing and a complicated circuit structure. Accordingly, the divider circuit 133 can process a wobble signal which is a high frequency signal that may have a very short cycle depending on the format of the optical disk 2.

However, the divider circuit 133 is not limited to this example.

Another example of the divider circuit 133 is described with reference to FIG. 4.

Another Example of Structure of Divider Circuit 133

Figure 4:
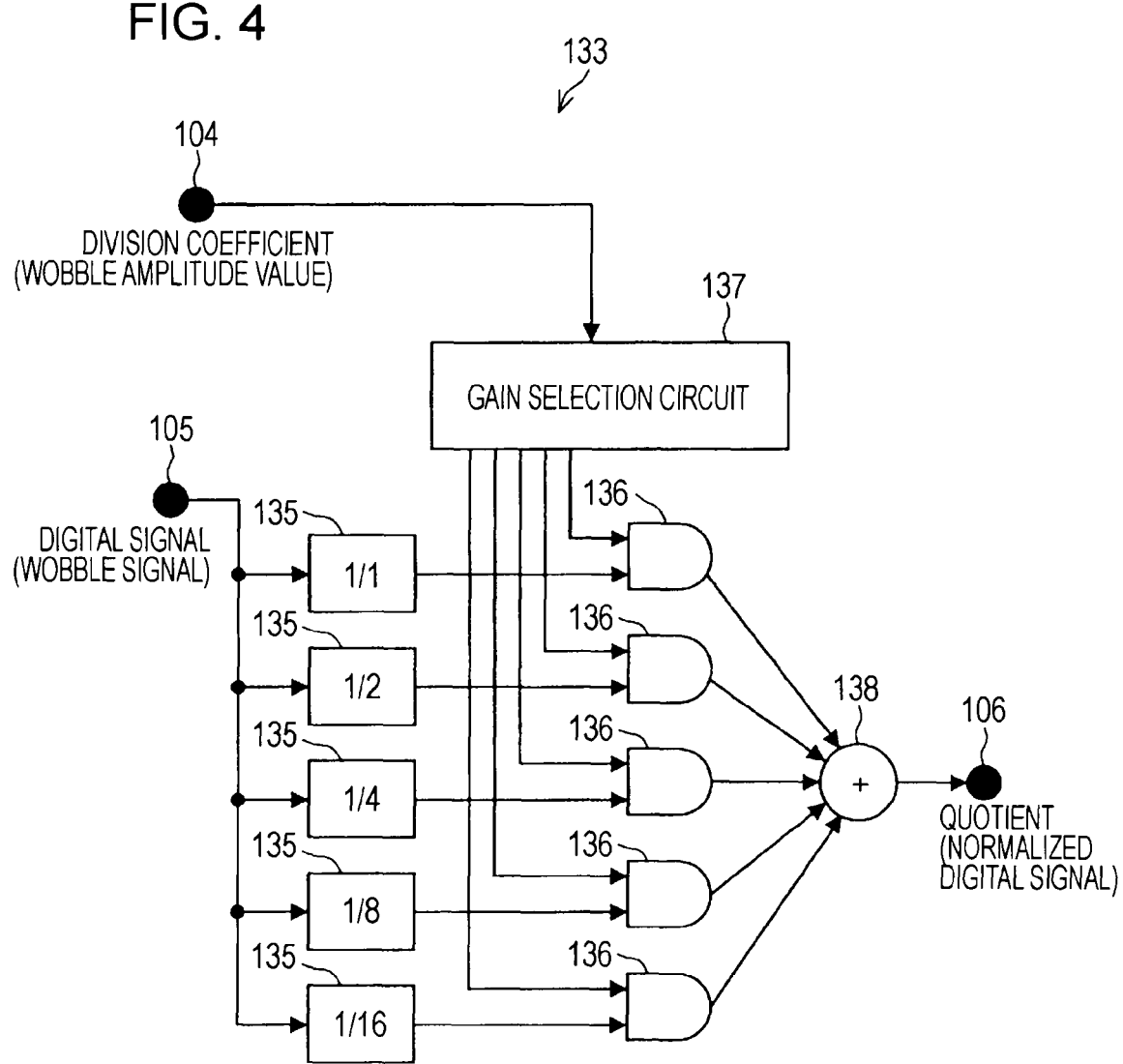
FIG. 4 is a block diagram for illustrating another example of the divider circuit included in the PLL circuit according to the embodiment.

FIG. 4 is a block diagram for illustrating another example of the divider circuit 133 included in the PLL circuit 100 according to the present embodiment.

This other example of the divider circuit 133 included in the PLL circuit 100 according to the present embodiment includes, as shown in FIG. 4, a plurality of multiplier circuits 135, a plurality of AND circuits 136, a gain selection circuit 137, and an adder circuit 138.

The multiplier circuits 135 each receive an input digital signal, multiplies the input digital signal by a positive value, and outputs the multiplied result. In order to do so, the multiplier circuits 135 are arranged in parallel and receive the same digital signal. The multiplying factor of each of the multiplier circuits 135, that is, a positive value multiplied, is set to, for example, ½, ¼, ⅛, or 1/16. By using multiples of ½ as multiplying factors of each of the multiplier circuits 135, for example, the multiplied result can be obtained by shifting a binary digital signal one digit. As a result, the processing rate can be increased. In this case, the multiplier circuits 135 may be implemented by, for example, shift operation circuits.

The multiplier circuits 135 each output the multiplied result to a corresponding one of the AND circuits 136. When an output signal from the gain selection circuit 137 is input to each of the AND circuits 136, each of the AND circuits 136 outputs the multiplied result output from a corresponding one of the multiplier circuits 135 to the adder circuit 138.

The gain selection circuit 137 receives an amplitude value measured by the amplitude measurement circuit 131 and outputs a signal to one of the AND circuits 136 corresponding to the amplitude value. That is, for the gain selection circuit 137, which of the AND circuits 136 is to be selected is determined in advance according to the input amplitude value. When an amplitude value is input to the gain selection circuit 137, the gain selection circuit 137 outputs a signal to one of the AND circuits 136 corresponding to the amplitude value. The gain selection circuit 137 described above may be configured as, for example, a table in which to which one of the AND circuits 136 a signal should be output is determined according to an amplitude value.

The adder circuit 138 adds a combination of one or more multiplied results output from the AND circuits 136 and outputs a quotient.

That is, this other example of the divider circuit 133 generates values obtained by dividing an input digital signal by multiple positive values and adds a combination of these quotients to generate a value substantially equivalent to a value obtained by dividing the digital signal by an amplitude value, thereby outputting this value as a quotient.

The multiplying factors of the multiplier circuits 135 are not limited to multiples of ½ and can be set to any values as long as they are multiples of a positive value.

According to this other example of the divider circuit 133, as in the foregoing example of the divider circuit 133, a quotient can be generated without performing division processing. Accordingly, the other example of the divider circuit 133 can process a wobble signal which is a high frequency signal that may have a very short cycle depending on the format of the optical disk 2.

Operation of PLL Circuit 100

The structure of the PLL circuit 100 has been described above.

Referring now to FIGS. 2 and 5 to 8, the operation of the PLL circuit 100 will be described. In particular, the description mainly concerns the output value from the phase comparator 150.

When an input signal (wobble signal) is input to the input terminal 101 of the PLL circuit 100 shown in FIG. 2, the A/D converter 120 converts the input signal into a digital signal on the basis of a clock signal output from the VCO 110 as a sampling clock. The digital signal is output to the normalizer 130.

The normalizer 130 normalizes the amplitude of the digital signal.

More specifically, the digital signal is branched to the amplitude measurement circuit 131 and the delay circuit 132. The amplitude measurement circuit 131 measures the amplitude value of the digital signal and outputs the amplitude value to the divider circuit 133. Alternatively, the amplitude value may be, for example, the maximum value of digital signals in one or more intervals or the average of digital signals in multiple intervals. In contrast, the digital signal input to the delay circuit 132 is delayed by a time involved in the measurement performed by the amplitude measurement circuit 131, and the delayed digital signal is output to the divider circuit 133.

The delayed digital signal is normalized by the divider circuit 133 by dividing the delayed digital signal by the amplitude value. That is, since the digital signal is normalized (divided) by the amplitude value, the digital signal is maintained at a substantially constant output value. More specifically, when the amplitude value of a digital signal input to the normalizer 130 is large, the normalizer 130 outputs a digital signal divided by the amplitude value. As a result, the amplitude value of the output digital signal is prevented from being excessively large. When the amplitude value of a digital signal input to the normalizer 130 is small, the normalizer 130 divides the digital signal by the amplitude value. That is, when the amplitude value is less than or equal to 1, the digital signal is amplified by being divided by the amplitude value. Since the normalizer 130 amplifies and outputs a digital signal whose amplitude is small by dividing the digital signal by the amplitude, the amplitude value of the output digital signal is prevented from being excessively small.

Next, the normalized digital signal is sent to the phase comparator 150. The phase comparator 150 compares the normalized digital signal with a comparison clock signal generated by dividing the frequency of a clock signal which is an output value of the PLL circuit 100 by n and sent as a feedback by the frequency divider 140. This phase comparison is performed by the multiplier circuit 151 and the adder circuit 152. The FF 153 plays the role of temporarily storing an output signal serving as the comparison result and outputting the output signal to the LF 160.

When there is a phase difference between the digital signal and the comparison clock signal, the phase comparator 150 outputs a predetermined signal (voltage value in this example) to control the phase of a clock signal generated by the VCO 110. That is, the frequency of a clock signal output from the PLL circuit 100 is determined by the level of the output value of the phase comparator 150. The LF 160 plays the role of smoothing the predetermined signal from the phase comparator 150 and outputting the smoothed signal to the VCO 110.

According to the PLL circuit 100 of the present embodiment, the frequency of the clock signal can be made stable regardless of the amplitude of the input signal. In other words, it is necessary to make the input signal to the VCO 110, that is, the output signal of the phase comparator 150, stable in order to make the frequency of the clock signal stable. According to the PLL circuit 100 of the present embodiment, the digital signal input to the phase comparator 150 can be made stable, and hence, the output signal of the phase comparator 150 can be made stable. As a result, the frequency of the clock signal can be made stable.

Referring now to FIGS. 5 to 8, the schematic operation of the phase comparator 150 is described, which is followed by a description of the stable output of the phase comparator 150 in the PLL circuit 100 according to the present embodiment, compared with the case of the related art where the output is unstable.

Operation of Phase Comparator 150

Figure 5:
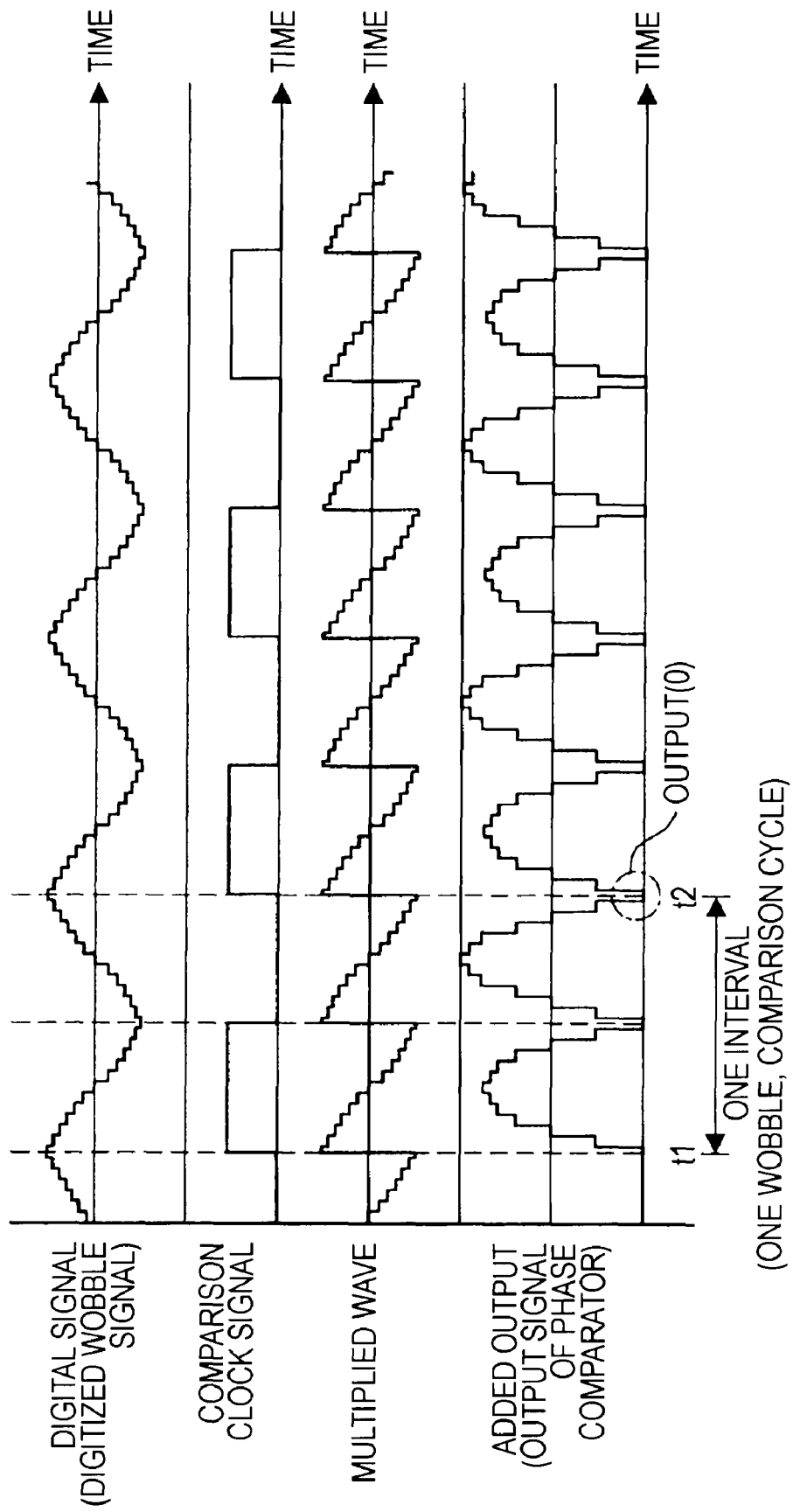
FIG. 5 is a graph for illustrating the schematic operation of a phase comparator in the case where there is no phase difference.

FIG. 5 is a graph for illustrating the schematic operation of the phase comparator 150 in the case where there is no phase difference between a digital signal and a comparison clock signal.

In FIG. 5, time is plotted in abscissa, and the amplitudes of a digital signal, a comparison clock signal, a multiplied wave, and an added output are schematically plotted in ordinate.

The digital signal indicates a digitized wobble signal generated by the A/D converter 120.

The comparison clock signal (may also be referred to as a "comparison frequency") indicates a clock signal obtained by performing frequency division using the frequency divider 140. In this case, the comparison clock signal is, for example, a binary value indicating 1 or 0 (square wave).

The multiplied wave indicates a signal obtained by multiplying the digital signal by the comparison clock signal using the multiplier circuit 151. In this case, the multiplier circuit 151 outputs the digital signal in the case where the comparison clock signal is 1 and outputs the digital signal multiplied by −1 in the case where the comparison clock signal is 0.

When a sine wave is used as the comparison clock signal instead of a square wave indicating 1 or 0, or when a binary square wave indicating 1 or −1 is used as the comparison clock signal, the multiplier circuit 151 multiplies the digital signal by the comparison clock signal.

The added output indicates a signal obtained by adding multiplied waves in units of comparison cycles (comparison intervals) using the adder circuit 152. The abscissa and ordinate axes in FIGS. 6 to 8 are common to those in FIG. 5.

The digital signal and the comparison clock signal shown in FIG. 5 are synchronized with each other, and the phase difference therebetween is substantially 0. In this case, the added output which is output to the VCO 110 at time t2 is 0. Therefore, the VCO 110 maintains the phase of the clock signal.

Figure 6:
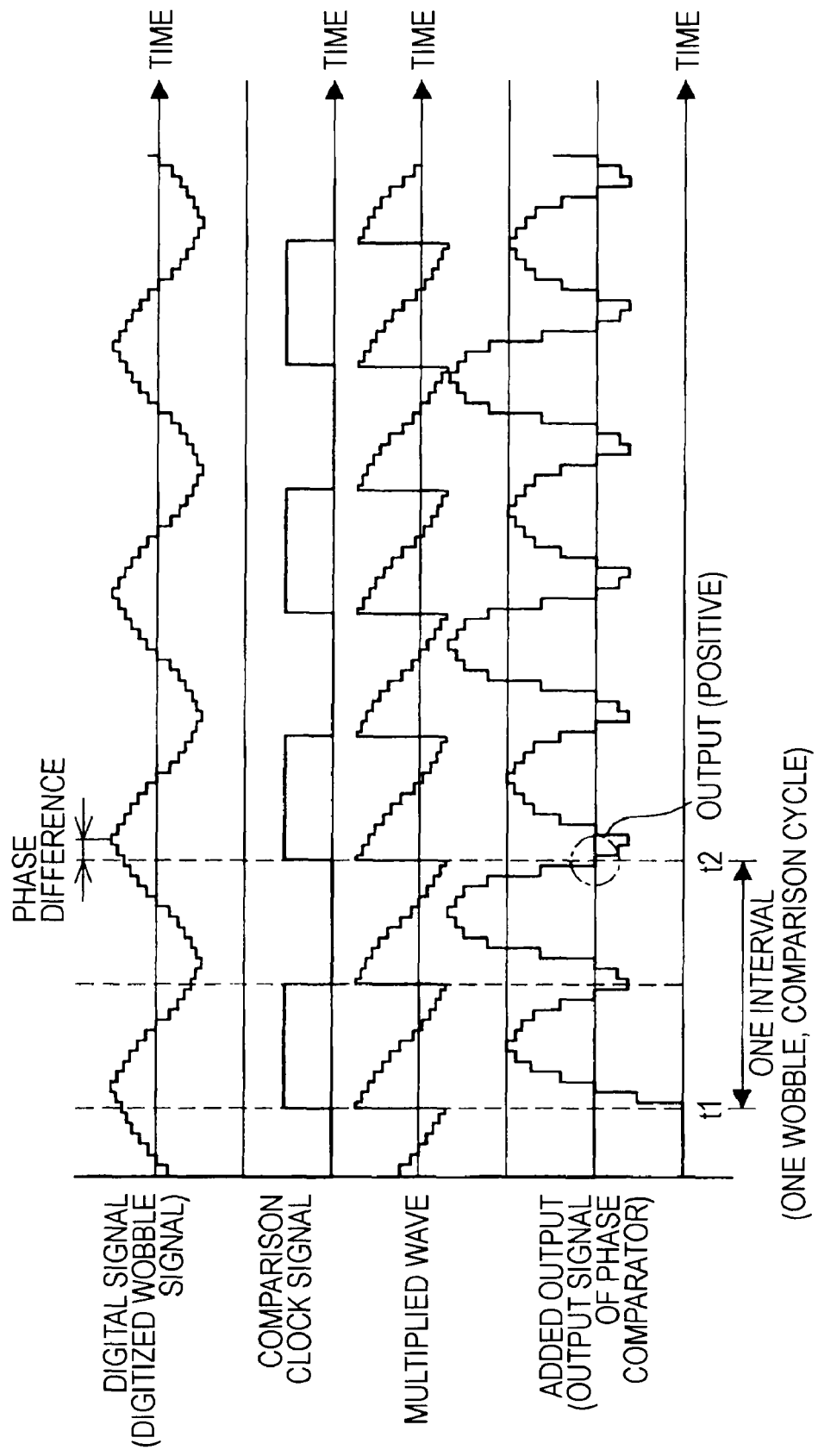
FIG. 6 is a graph for illustrating the schematic operation of the phase comparator in the case where the digital signal is delayed.
Figure 7:
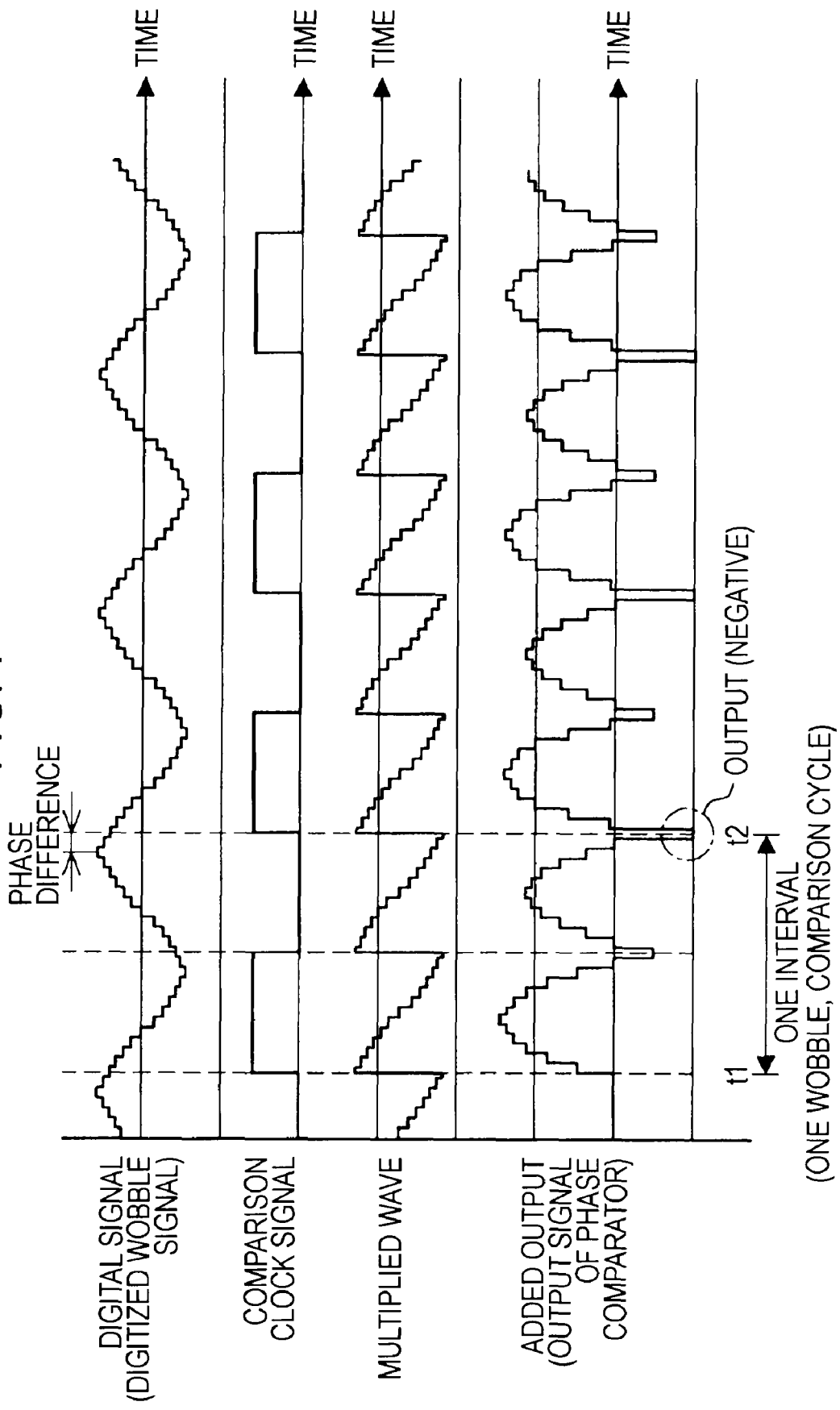
FIG. 7 is a graph for illustrating the schematic operation of the phase comparator in the case where the digital signal is advanced.
Figure 8:
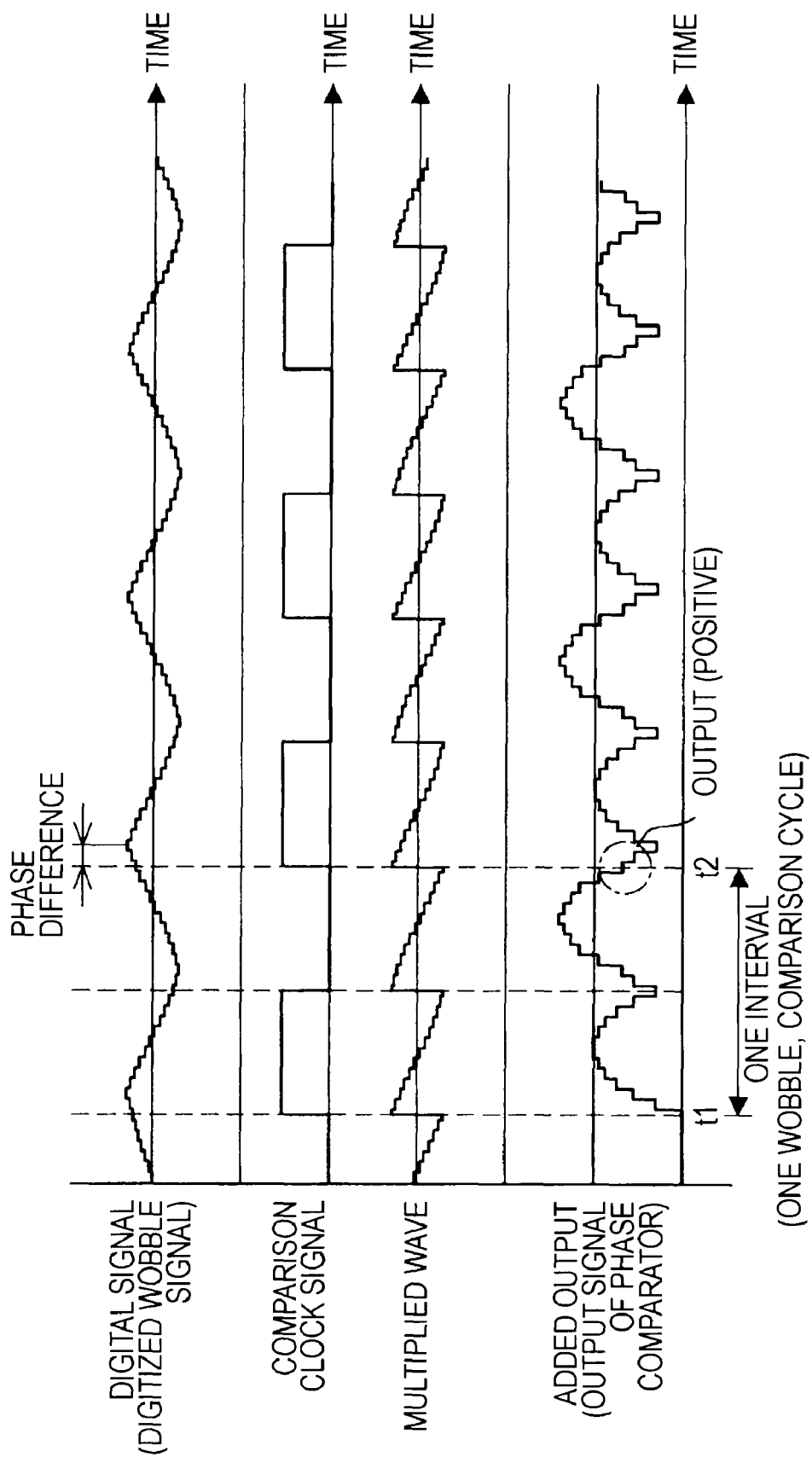
FIG. 8 is a graph for illustrating the schematic operation of the phase comparator in the case where a wobble signal is reduced and the digital signal is delayed.

In contrast, the case in which there is a phase difference is illustrated in FIGS. 6 and 7.

FIG. 6 is a graph for illustrating the schematic operation of the phase comparator 150 in the case where the digital signal is delayed with respect to the comparison clock signal. FIG. 7 is a graph for illustrating the schematic operation of the phase comparator 150 in the case where the digital signal is advanced with respect to the comparison clock signal.

Referring to FIG. 6, when the digital signal is delayed with respect to the comparison clock signal, a phase difference is generated between the two signals. This phase difference becomes the added output which is an output to the VCO 110 at time t2. That is, the added output at time t2 becomes a positive value, and the phase of a clock signal generated by the VCO 110 is controlled according to the level of the added output so that there will be no phase difference between the digital signal and the comparison clock signal.

In contrast, referring now to FIG. 7, when the digital signal is advanced with respect to the comparison clock signal, a phase difference opposite to that shown in FIG. 6 is generated between the two signals. This phase difference becomes the added output which is an output to the VCO 110 at time t2. That is, the added output at time t2 becomes a negative value, and the phase of a clock signal generated by the VCO 110 is controlled according to the added output so that there will be no phase difference between the digital signal and the comparison clock signal.

As in the PLL circuit 200 of the related art, when the amplitude value of a wobble signal which is an input signal becomes smaller, the value of the added output which is output to control the VCO 110 is affected not only by the phase difference, but also by the amplitude value of the wobble signal. That is, changes in the amplitude value of the wobble signal affect the clock signal of the VCO 110. Referring now to FIG. 8 in contrast to FIG. 6, changes in the added output value due to changes in the amplitude of the wobble signal are described below.

FIG. 8 is a graph for illustrating the schematic operation of the phase comparator 150 in the case where the wobble signal is reduced and the digital signal is delayed.

Referring to FIG. 8, when the amplitude value of the wobble signal is reduced to approximately half, the amplitude value of the digital signal input to the phase comparator 150 is also reduced to approximately half. In this case, when the digital signal is delayed with respect to the comparison clock signal, a phase difference is generated between the two signals. However, the level of the added output at time t2 based on the phase difference is also reduced to approximately half, compared with the level of the added output of the PLL circuit 100 according to the present embodiment, which is shown in FIG. 6. That is, according to the PLL circuit 200 of the related art, when the amplitude of an input signal is reduced to approximately half, the phase comparator 240 operates as if the phase difference were reduced to approximately half even though the phase difference remains unchanged.

This change in the level of the added output affects how the phase of the clock signal generated by the VCO 110 is controlled. In other words, the phase of the clock signal generated by the VCO 110 is controlled according to the level of the added output. However, a change in the amplitude of the wobble signal causes a change in the level of the added output, resulting in improper control of the phase of the clock signal. Therefore, according to the PLL circuit 200 of the related art or a PLL circuit of the related art, because of changes in the amplitude of the wobble signal, the phase of the output clock signal becomes unstable, thereby outputting phase errors of the clock signal.

In contrast to the PLL circuit 200 of the related art, according to the PLL circuit 100 of the present embodiment, as has been described above, the amplitude of a digital signal input to the phase comparator 150 can be maintained substantially constant. Therefore, the phase of a clock signal output from the PLL circuit 100 can be made constantly stable.

Advantages of Present Embodiment

The recording apparatus 1 and the PLL circuit 100 according to the present embodiment have been described above.

According to the PLL circuit 100 of the present embodiment, the amplitude value of a digital signal input to the phase comparator 150 can be maintained substantially constant. Therefore, phase errors of a clock signal which is an output of the PLL circuit 100 can be reduced.

In general, a wobble signal which is an input signal to the PLL circuit 100 has a high frequency. However, according to the PLL circuit 100 of the present embodiment, since a digitized wobble signal generated by the A/D converter 120 is normalized, such high-frequency wobble signals are normalized on a signal-by-signal basis (on an interval-by-interval basis), that is, in units of wavelengths of wobble signals. Therefore, even a high-frequency wobble signal can be normalized, and hence, phase errors of a clock signal can be reduced.

Further, since the normalizer 130 has one example or the other example of the divider circuit 133 described above, division processing necessary for normalization can be performed at a high speed, and hence, a high-frequency wobble signal can be processed.

According to the recording apparatus 1 of the present embodiment including the PLL circuit 100 described above, when recording is performed on a recording medium such as the optical disk 2, jitter caused by changes in the amplitude of a wobble signal due to crosstalk from adjacent tracks, beat noise, differences in output amplitude before and after recording, and variations in quality of recording media can be reduced.

The fabrication tolerance of the pickup 11 or the like, which is necessary for preventing crosstalk and suppressing the effect of beat noise, can be relaxed. Accuracy necessary for preparing characteristics of each structure can also be relaxed. Accordingly, mass productivity can be enhanced, and yield can be improved.

Even when a wobble signal is changed, modulation can be sufficiently demodulated, and correct address can be read. Accordingly, the wasted time taken to read correct address information can be reduced. Further, recording on recording media that greatly vary from one medium to another can be performed in a stable manner.

The preferred embodiment of the present invention has been described with reference to the accompanying drawings. However, the present invention is not limited to the foregoing exemplary embodiment. It should be understood by those skilled in the art that various modifications, combinations, sub-combinations, and alterations may occur depending on design requirements and other factors insofar as they are within the scope of the appended claims or the equivalents thereof.

For example, the basic structure of the PLL circuit 100 has been described in the foregoing embodiment. However, the present invention is not limited to this example. The present invention is applicable to a PLL circuit with any structure as long as it is a digital PLL circuit. For example, when the comparison clock signal is a binary signal indicating 1 or 0, instead of the multiplier circuit 151 and the adder circuit 152 in the phase comparator 150, an integrator circuit may be used, which integrates a digital signal in a comparison interval by adding the digital signal in the case where the comparison clock signal is 1 and subtracting the digital signal in the case where the comparison clock signal is 0.

In the foregoing embodiment, one and the other example of the divider circuit 133 have been described. However, the present invention is not limited to these examples. The divider circuit 133 can be configured in any manner as long as it is a circuit that can divide a delayed digital signal generated by the delay circuit 132 by an amplitude value measured by the amplitude measurement circuit 131.

In the foregoing embodiment, the phase comparator 150 includes the FF 153. However, the present invention is not limited to this example. For example, the phase comparator 150 may be configured in any manner as long as it can output an output signal (added output) to the LF 160. In this case, the phase comparator 150 may not necessarily include the FF 153.

In the foregoing embodiment, the waveforms of various signals are illustrated in FIGS. 5 to 8. However, these graphs conceptually illustrate the operation of the phase comparator 150, and the present invention is not limited to these examples. That is, for example, a sine-wave digital signal is illustrated as an example of a digital signal. However, this digital signal may be a signal obtained by modulating the sine wave. A binary signal indicating 1 or 0 is illustrated as a comparison clock signal. However, a binary signal indicating −1 or 1 or a sine-wave signal may be used as the comparison clock signal. In this case, the multiplier circuit 151 may multiply the comparison clock signal by the digital signal, and the adder circuit 152 may simply add multiplied values within one interval.

In the foregoing embodiment, the structure of the recording apparatus 1 is shown in FIG. 1, and this structure has been described. However, the present invention is not limited to this exemplary structure. For example, the present invention is applicable to any recording apparatus that performs recording on a recording medium using a write clock signal generated by reading modulation (e.g., a wobble signal) formed on the recording medium and generating the write clock signal from the modulated signal.

What is claimed is:

1. A phase-locked loop circuit that generates a clock signal synchronized with an input signal with a predetermined frequency, comprising:
    an oscillator configured to oscillate and generate the clock signal;
    a converter configured to convert the input signal into a digital signal using the clock signal generated by the oscillator as a sampling clock;
    a frequency divider configured to divide a frequency of the clock signal generated by the oscillator to generate a comparison clock signal and send the comparison clock signal as a feedback;
    a normalizer configured to normalize an amplitude value of the digital signal generated by the converter; and
    an oscillation controller configured to control a phase of the clock signal generated by the oscillator so as to reduce a phase difference between the normalized digital signal generated by the normalizer and the comparison clock signal sent as a feedback by the frequency divider,
    wherein the normalizer includes:
    an amplitude measurement circuit configured to measure the amplitude value of the digital signal generated by the converter;
    a delay circuit configured to delay the digital signal generated by the converter by a time involved in measurement performed by the amplitude measurement circuit; and
    a divider circuit configured to divide the delayed digital signal generated by the delay circuit by the amplitude value measured by the amplitude measurement circuit.

2. The phase-locked loop circuit according to claim 1, wherein the divider circuit extracts, from among multiple normalized digital signals stored in advance, a normalized digital signal corresponding to the delayed digital signal generated by the delay circuit and the amplitude value measured by the amplitude measurement circuit.

3. The phase-locked loop circuit according to claim 1, wherein the divider circuit includes:
    a plurality of multiplier circuits each configured to receive the delayed digital signal generated by the delay circuit and multiply the digital signal by one of different positive values; and
    an adder circuit configured to add a combination of one or more multiplied digital signals obtained by the plurality of multiplier circuits to generate a quotient obtained by dividing the delayed digital signal generated by the delay circuit by the amplitude value measured by the amplitude measurement circuit.

* * * * *